(12) United States Patent
Lee (10) Patent No.: US 9,325,126 B2
(45) Date of Patent: Apr. 26, 2016

(54) DIRECT ATTACH MEDIA CONVERTER

(71) Applicant: DAWNRAY TECH. CO., LTD., New Taipei (TW)

(72) Inventor: Chun Te Lee, New Taipei (TW)

(73) Assignee: DAWNRAY TECH. CO., LTD., New Taipei (TW)

( * ) Notice: Subject to any disclaimer, the term of this patent is extended or adjusted under 35 U.S.C. 154(b) by 0 days.

(21) Appl. No.: 14/315,035

(22) Filed: Jun. 25, 2014

(65) Prior Publication Data

US 2015/0003793 A1    Jan. 1, 2015

(30) Foreign Application Priority Data

Jun. 26, 2013  (TW) .............................. 102122634 A (51) Int. Cl.
| | |
|---|---|
| *G02B 6/36* | (2006.01) |
| *H01R 24/64* | (2011.01) |
| *H01R 13/66* | (2006.01) |
| *H01R 31/06* | (2006.01) |
| *G02B 6/38* | (2006.01) |
| *G02B 6/42* | (2006.01) |

(52) U.S. Cl.
CPC .............. *H01R 24/64* (2013.01); *G02B 6/4285* (2013.01); *H01R 13/665* (2013.01); *H01R 31/065* (2013.01); *G02B 6/3817* (2013.01); *G02B 6/3897* (2013.01); *G02B 6/4246* (2013.01); *G02B 6/4261* (2013.01); *G02B 6/4284* (2013.01)

(58) Field of Classification Search
CPC .. G02B 6/3817; G02B 6/3897; G02B 6/4246; G02B 6/64261; G02B 6/4284; H01R 24/64; H01R 13/665; H01R 31/065

USPC .................... 385/53, 55, 73, 88–89; 398/135, 398/138–139

See application file for complete search history.

(56) References Cited

U.S. PATENT DOCUMENTS

| | | | | |
|---|---|---|---|---|
| 6,203,333 | B1 * | 3/2001 | Medina ............. | H01R 13/6658 439/465 |
| 7,156,562 | B2 | 1/2007 | Mazotti et al. | |
| 7,255,488 | B1 * | 8/2007 | Boone et al. .................... | 385/75 |
| 7,331,819 | B2 * | 2/2008 | Nelson ................. | G02B 6/4201 385/88 |
| 7,361,053 | B1 * | 4/2008 | Boone et al. ............... | 439/541.5 |
| 7,499,616 | B2 | 3/2009 | Aronson et al. | |
| 7,876,989 | B2 * | 1/2011 | Aronson ............. | G02B 6/4292 385/101 |
| 8,636,424 | B2 * | 1/2014 | Kuffel et al. .................... | 385/78 |

(Continued)

FOREIGN PATENT DOCUMENTS

| | | |
|---|---|---|
| TW | I303724 | 12/2008 |
| TW | M393828 | 12/2010 |
| TW | I360673 | 3/2012 |

*Primary Examiner* — Ryan Lepisto
*Assistant Examiner* — Guy Anderson
(74) *Attorney, Agent, or Firm* — Chen Yoshimura LLP (57) ABSTRACT

A direct attach media converter is provided. The direct attach media converter comprises a media converter module, a connecting wire and a pluggable transceiver module. The media converter module is configured to transform a RJ-45 interface signal into a pluggable transceiver module interface signal or transform a pluggable transceiver module interface signal into a RJ-45 interface signal. The connecting wire is directly connected to the media converter module and is configured to transmit the pluggable transceiver module interface signal. The pluggable transceiver module is electrically connected to the connecting wire and is configured to receive and transmit the pluggable transceiver module interface signal.

11 Claims, 5 Drawing Sheets

(56) References Cited

U.S. PATENT DOCUMENTS

| | | | |
|---|---|---|---|
| 2004/0197104 A1* | 10/2004 | Doo et al. | 398/164 |
| 2005/0196119 A1* | 9/2005 | Popovic et al. | 385/134 |
| 2006/0075175 A1* | 4/2006 | Jensen et al. | 710/305 |
| 2007/0010132 A1* | 1/2007 | Nelson | G02B 6/4201 439/577 |
| 2007/0122086 A1* | 5/2007 | Lin | 385/88 |
| 2007/0173101 A1* | 7/2007 | Togami et al. | 439/372 |
| 2007/0237468 A1* | 10/2007 | Aronson et al. | 385/100 |
| 2007/0274351 A1* | 11/2007 | Theodoras | 370/537 |
| 2008/0044141 A1* | 2/2008 | Willis et al. | 385/88 |
| 2008/0155157 A1* | 6/2008 | Lee | 710/301 |
| 2012/0249871 A1* | 10/2012 | Nguyen et al. | 348/441 |
| 2014/0038462 A1* | 2/2014 | Coffey et al. | 439/620.15 |
| 2014/0258742 A1* | 9/2014 | Chien et al. | 713/300 |
| 2014/0355755 A1* | 12/2014 | Hong et al. | 380/28 |
| 2014/0369214 A1* | 12/2014 | Jinsong et al. | 370/252 |

* cited by examiner

DIRECT ATTACH MEDIA CONVERTER

This application claims priority to Taiwan Patent Application No. 102122634 filed on Jun. 26, 2013.

CROSS-REFERENCES TO RELATED APPLICATIONS

Not applicable.

BACKGROUND OF THE INVENTION

1. Field of the Invention

The present invention relates to a media converter. In particular, the present invention relates to a direct attach media converter transforming the RJ-45 interface signal and the pluggable transceiver module interface signal.

2. Descriptions of the Related Art

With the Internet's rapid development and popularization of Internet, the contents of the communication and the demand for bandwidth for users are increasing. In order to meet this demand, Internet service providers continue to build large data centers, high-speed computing centers or data storage centers. Meanwhile, for high-speed and massive network transmission, network communication industry organizations IEEE802.3an also developed a more high-speed communication physical layer transmission standard; such as 10GBASE-T, which can support a transmission rate of 10 Gbit/s for a transmission distance of 100 meters in shielded twisted pair (STP) or in unshielded twisted pair (UTP). RJ-45 interface has been widely used by 10GBASE-T in ethernet. On the other hand, IEEE802.3ae also developed another physical layer transmission standard 10GBASE-R, which also supports 10 Gbit/s transfer rate by using optical fibers as the transmission medium.

In general, different transmission media cannot be directly interconnected. Therefore, when building network communication link, in order to support both transmission standards 10GBASE-T and 10GBASE-R's, a network physical layer media converter would be used to convert the transmission medium. A media converter, for example, would be used to connect the copper cable and the optical fiber cable to enhance the convenience for building the network communication link.

Figure 1:
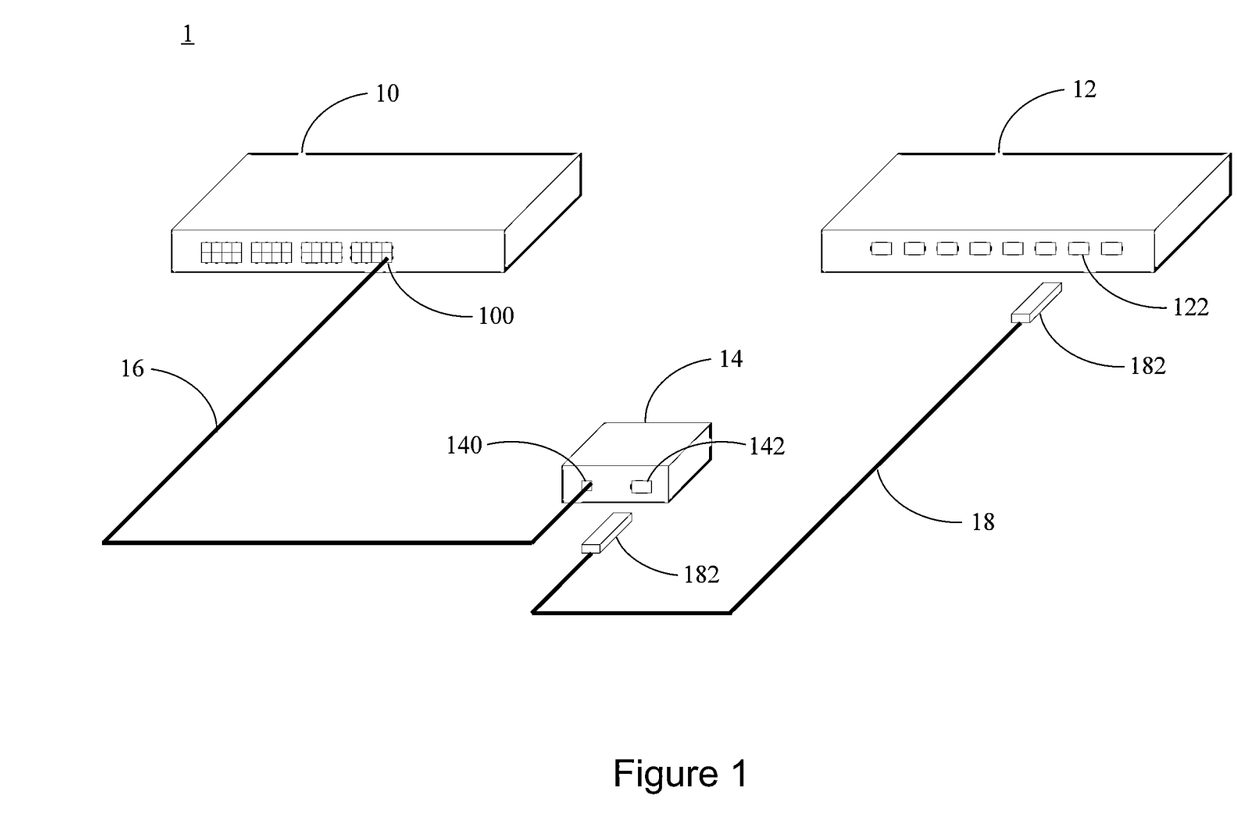
FIG. 1 is an illustration of the prior media converter system.

For instance, a common network device of 10 Gbit/s Ethernet uses two different transmission interfaces, the RJ-45 interface and the pluggable transceiver module interface. However, these two transmission interfaces cannot be directly interconnected. The media converter is a must to connect these two transmission interfaces. Referring to FIG. 1, a conventional media converter system has been depicted for transforming the RJ-45 interface to the pluggable transceiver module. As shown, the media converter system 1 comprises an RJ-45 interface network switch 10, an enhanced small form-factor pluggable (SFP+) interface network switch 12 and a media converter 14. The media converter 14 has an RJ-45 interface port 140 and an SFP+ interface port 142. The RJ-45 interface network switch 10 is connected to the media converter 14 through an RJ-45 cable 16. Each end of the RJ-45 cable 16 respectively has an RJ-45 interface connector for connecting to the RJ-45 interface port 100 of the RJ-45 interface network switch 10 and to the RJ-45 interface port 140 of the media converter 14. The SFP+ interface network switch 12 is connected to the media converter 14 via an optical fiber cable 18. Each end of the optical fiber cable 18 respectively has an SFP+ interface optical transceiver module 182 for connecting to the SFP+ interface port 122 of the SFP+ interface network switch and to the SFP+ interface 142 of the media converter 14.

The media converter system as shown in FIG. 1 is not perfect without drawbacks. Specifically, the media converter 14 must have both the RJ-45 interface port 140 and the SFP+ interface port 142. Further, the optical fiber cable 18 also must use two pluggable transceiver modules 182 to connect the SFP+ interface network switch 12 and the media converter 14. Thus, when building large-scale network communication links, the complexity and the difficulty of the links would be increased. The cost of building the links would be added as well. On the other hand, the signal after the transmission through the pluggable transceiver modules and the SFP+ interface ports will inevitably lead to the downgrade of the signal and increase of the noise. Excessive port links will seriously affect the quality of signal transmission.

In view of the above, it is essential for the skilled in this art to create an ideal way to convert between the RJ-45 interface and the pluggable transceiver module interface for lowering the cost and the complexity of the links and providing good quality of signal transmission.

SUMMARY OF THE INVENTION

An objective of the present invention is to provide a direct attach media converter. The direct attach media converter comprises a media converter module, a connecting wire and a pluggable transceiver. The media converter comprises a physical layer integrated circuit and a signal conditioner integrated circuit. The physical layer integrated circuit is used to transform a RJ-45 interface signal into a pluggable transceiver module interface signal or to transform a pluggable transceiver module interface signal into a RJ-45 interface signal. The signal conditioner integrated circuit is electrically connected to the physical layer integrated circuit for conditioning the pluggable transceiver module interface signal. The connecting wire is directly connected to the signal conditioner integrated circuit for transmitting the pluggable transceiver module interface signal. The pluggable transceiver module is electrically connected to the connecting wire for receiving and transmitting the pluggable transceiver module interface signal.

According to one embodiment of the present invention, the media converter module further comprises a RJ-45 interface port and a converter. The RJ-45 interface port is used to receive the RJ-45 interface signal. The converter is electrically connecting between the RJ-45 interface port and the physical layer integrated circuit for providing isolation between the RJ-45 interface port and the physical layer integrated circuit.

According to one embodiment of the present invention, the connecting wire comprises a data link. The data link is a twin axial cable or an optical fiber cable.

According to one embodiment of the present invention, the connecting wire comprises a power link for providing power to the media converter module from the pluggable transceiver module.

According to one embodiment of the present invention, the connecting wire comprises a control link for transmitting a control signal from the pluggable transceiver module to the media converter module or transmitting a status signal from the media converter module to the pluggable transceiver module.

According to one embodiment of the present invention, the RJ-45 interface signal is one of a 10GBASE-T interface signal, a 40 GBASE-T interface signal and a 100 GBASE-T interface signal.

According to one embodiment of the present invention, the pluggable transceiver module interface signal is one of an XFI/SFI interface signal, an XAUI interface signal, an XLAUI interface signal and a CAUI interface signal.

According to one embodiment of the present invention, the pluggable transceiver module interface signal is one of an enhanced Small Form-factor Pluggable (SFP+) optical transceiver module, a 10 Gigabit Small Form-factor Pluggable (XFP) optical transceiver module, an XENPAK optical transceiver module, an X2 optical transceiver module, and an enhanced Quad Small Form-factor Pluggable (QSFP+) optical transceiver module.

Another objective of the present invention is to provide a media converter module directly connected to a connecting wire. The media converter module comprises a housing and a converter circuit. The housing comprises an interface port, pluggably connected to a RJ-45 cable to receive a RJ-45 interface signal. The converter circuit is electrically connected between the interface port and the connecting wire to transform the RJ-45 interface signal into a pluggable transceiver module interface signal or to transform a pluggable transceiver module interface signal into the RJ-45 interface signal.

The direct attach media converter of the present invention is directly connected to a media converter module via a connecting wire. Thus, the pluggable transceiver module interface signal can be directly transmitted to the connecting wire after being transformed by the media converter module without through the link of the pluggable transceiver module and the pluggable transceiver module interface port. That is, the direct attach media converter of the present invention only needs a single pluggable transceiver module. Accordingly, the present invention can solve the problem of the complexity and the difficulty of excessive pluggable transceiver module links and high costs for building the communication links of the prior art. The media converter system of the present invention would be simplified and enhance the quality of signal transmission.

The detailed technology and some embodiments implemented for the present invention are described in the following paragraphs to well illustrate the above objectives, technical features and advantages of the claimed invention.

DESCRIPTION OF THE PREFERRED EMBODIMENT

The following will describe the present invention in detail by some embodiments with reference to the drawings appended. However, without departing from the spirit of the present invention, the present invention may be embodied in various embodiments and should not be limited to the embodiments described in the specification and drawings. In addition, unless it is additionally explained, the expressions "a," "the," or the like recited in the specification of the present invention (especially in the appended claims) should be regarded to comprise the singular and the plural forms. Furthermore, for clarity, the size of each element and each area may be exaggerated in the attached drawings, and the components not directly relevant to the present invention are omitted.

Figure 2:
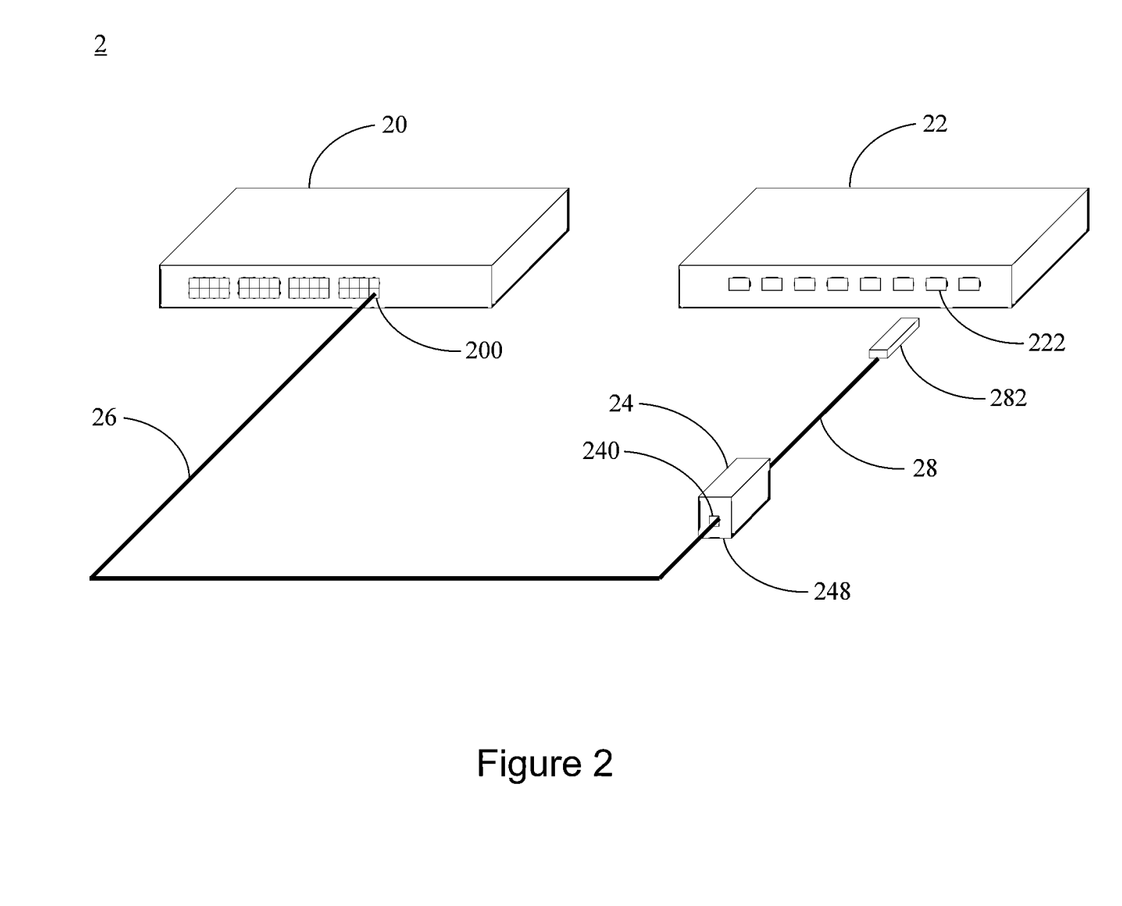
FIG. 2 is an illustration of the media converter system of the present invention.

As shown in FIG. 2, a media converter system 2 of the first embodiment of the present invention has been illustrated. The media converter system 2 comprises an RJ-45 interface network switch 20, a pluggable transceiver module interface network switch 22, an RJ-45 cable 26 and a direct attach media converter. The direct attach media converter comprises a media converter module 24, a connecting wire 28 and a pluggable transceiver module 282. The media converter module 24 comprises a housing 248 which comprises an RJ-45 interface port 240 for pluggably connecting to the RJ-45 cable 26 and receiving the RJ-45 interface signal. The connecting wire 28 is directly connecting to the media converter module 24. The pluggable transceiver module 282 is electrically connecting to the connecting wire 28. The media converter module 24 further comprises a converter circuit, electrically connected between the RJ-45 interface port 240 and the connecting wire 28, to transform the RJ-45 interface signal into a pluggable transceiver module interface signal or to transform a pluggable transceiver module interface signal into the RJ-45 interface signal.

The RJ-45 interface network switch 20 comprises an RJ-45 interface port 200. Both ends of the RJ-45 cable 26 respectively comprise an RJ-45 interface connector for connecting to the RJ-45 interface port 200 of the RJ-45 interface network switch 20 and to the RJ-45 interface port 240 of the media converter module 24. The pluggable transceiver module interface network switch 22 comprises a pluggable transceiver module interface port 222 for connecting to the pluggable transceiver module 282 of the direct attach media converter. A detailed description for the media converter system 2 of the present invention will be disclosed in the following.

The media converter system 2 is configured to transform an RJ-45 interface signal into a pluggable transceiver module interface signal. Specifically, the RJ-45 interface network switch 20 is configured to transform and output the RJ-45 interface signal through the RJ-45 interface port 200. The RJ-45 cable 26 is configured to connect the RJ-45 interface port 200 of the RJ-45 interface network switch 20 and the RJ-45 interface port 240 of the media converter module 24 to transmit the RJ-45 interface signal to the media converter module 24. Then, the media converter module 24 will transform the RJ-45 interface signal into the pluggable transceiver module interface signal and will transmit the signal to the connecting wire 28. The connecting wire 28 is configured to transmit the pluggable transceiver module interface signal to the pluggable transceiver module 282. Finally, the pluggable transceiver module 282 is configured to connect with the pluggable transceiver module interface port 222 of the pluggable transceiver module interface network switch 22 and transmit the pluggable transceiver module interface signal to the pluggable transceiver module interface network switch 22. The pluggable transceiver module interface network switch 22 is configured to process the pluggable transceiver module interface signal.

Similarly, the media converter system 2 would be configured to transform an RJ-45 interface signal into a pluggable transceiver module interface signal. Specifically, the pluggable transceiver module interface network switch 22 is configured to output the pluggable transceiver module interface signal to the pluggable transceiver module 282 through the pluggable transceiver module interface port 222. The connecting wire 28 is electrically connected with the pluggable transceiver module 282 and configured to transmit the pluggable transceiver module interface signal to the media converter module 24. Then, the media converter module 24 is configured to transform the pluggable transceiver module interface signal into the RJ-45 interface signal and to transmit the RJ-45 interface signal to the RJ-45 cable 26 through the RJ-45 interface port 200. The RJ-45 interface network switch 20 is configured to receive and process the RJ-45 interface signal through the RJ-45 interface port 200.

It is noted the direct attach media converter of the present invention only needs one pluggable transceiver module. Specially, the connecting wire 28 is directly connecting to the media converter module 24. The media converter module 24 will transform the RJ-45 interface signal into the pluggable transceiver module interface signal and directly transmit the pluggable transceiver module interface signal to the connecting wire 28 without connecting with the connecting wire 28 through the pluggable transceiver module interface port and pluggable transceiver module. That is, the media converter module 24 of the present invention do not comprise any pluggable transceiver module interface port and the connecting wire 28 of the present invention only connects to one pluggable transceiver module 282. Thus, the direct attach media converter of the present invention would decrease the cost and the complexity of building the communication links by reducing the amount of the pluggable transceiver modules. In another aspect, the direct attach media converter of the present invention would reduce the links of the pluggable transceiver module and the pluggable transceiver module interface port, and accordingly, the quality of signal transmission would be enhanced by decreasing the signal degradation and distortion.

Figure 3:
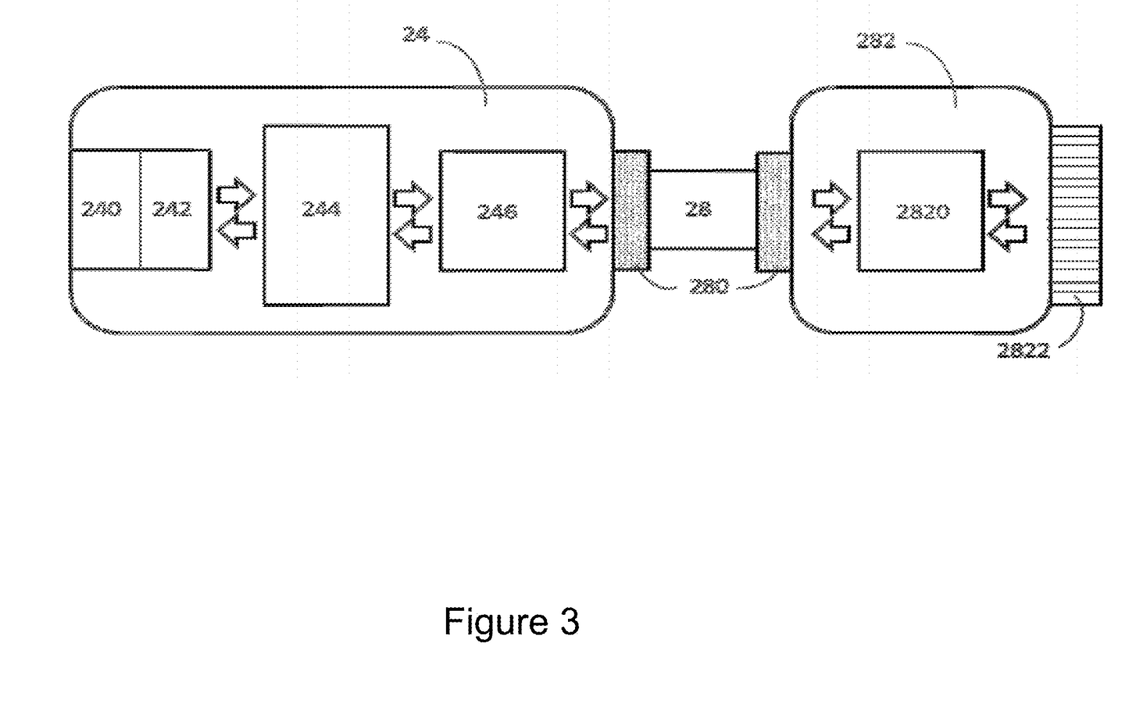
FIG. 3 is an illustration of the direct attach media converter system of the present invention.

As shown in FIG. 3, the direct attach media converter 3 of the second embodiment of the present invention has been illustrated. The direct media converter 3 comprises a media converter module 24, a connecting wire 28 and a pluggable transceiver module 282. The media converter module 24 comprises an RJ-45 interface port 240 and a converter circuit. The pluggable transceiver module 282 comprises a signal conditioner integrated circuit 2820 and a set of pins 2822. The converter circuit comprises a converter 242, a physical layer integrated circuit 244, and a signal conditioner integrated circuit 246. The converter 242 is electrically connected to the RJ-45 interface port 240. The physical layer integrated circuit 244 is electrically connected to the converter 242. The signal conditioner integrated circuit 246 is electrically connected to the physical layer integrated circuit 244. The connecting wire 28 is electrically connected to the signal conditioner integrated circuit 246. The signal conditioner integrated circuit 2820 is electrically connected to the connecting wire 28. The pins 2822 is electrically connected to the signal conditioner integrated circuit 2820.

As disclosed above, the media converter module 24 is configured to transform the RJ-45 interface signal into the pluggable transceiver module interface signal. More detailed, the RJ-45 interface port 240 is configured to receive the RJ-45 interface signal and transmit the signal into the converter 242. The converter 242 is electrically connected between the RJ-45 interface port 240 and the physical layer integrated circuit 244 and configured to transmit the RJ-45 interface signal and to provide isolation between the RJ-45 interface port 240 and the physical layer integrated circuit 244. Specifically, the converter 242 has three main functions. First, isolation of direct currents between two link devices. Each electric potential of the two link devices is not necessarily equal. It is possible to damage these two link devices and degrade the quality of signal transmission if they are directly connected. The converter of the present invention would be used to isolate the direct currents between them and thus protect the link devices and transmission quality. Second, noise isolation. In general, cable transmission for long distances will bring in outside noise. The converter of the present invention can be used to filter out noise beyond the signal band to improve the reliability of signal transmission. Third, ESD (electrostatic discharge) protection. The converter of the present invention can be used to isolate the instantaneous nature of electronic pulses to avoid direct damage to the physical layer integrated circuits.

Further, the converter 242 will transmit the RJ-45 interface signal to the physical layer integrated circuits 244. The physical layer integrated circuits 244 will transform the RJ-45 interface signal into the pluggable transceiver module interface signal. The RJ-45 interface signal would be one of a 10GBASE-T interface signal, a 40 GBASE-T interface signal and a 100 GBASE-T interface signal. The pluggable transceiver module interface signal would be one of an XFI/SFI interface signal, an XAUI interface signal, an XLAUI interface signal and a CAUI interface signal. For example, the physical layer integrated circuits 244 would be configured to be transformed between the XFI/SFI interface signal and the 10GBASE-T interface signal, between the XAUI interface signal and the 10GBASE-T interface signal, between the XLAUI interface signal and the 40 GBASE-T interface signal, or between the CAUI interface signal and the 100 GBASE-T interface signal. Please be noted the RJ-45 interface signal would be referred to the signal transmitted through the RJ-45 interface. The 10GBASE-T interface signal, the 40 GBASE-T interface signal and the 100 GBASE-T interface signal mentioned above are only several examples but not limited. Similarly, the pluggable transceiver module interface signal would be referred to the signal transmitted through the pluggable transceiver module interface. The XFI/SFI interface signal, the XAUI interface signal, the XLAUI interface signal and the CAUI interface signal are only several examples but not limited.

The pluggable transceiver module interface signal transformed by the physical layer integrated circuit 244 would be transmitted to the signal conditioner integrated circuit 246. The signal conditioner integrated circuit 246 will condition the integrity of the physical layer signal of the pluggable transceiver module interface signal. For example, the signal conditioner integrated circuit 246 would perform the operation of re-shaping, re-timing, or electrical dispersion compensation (EDC) to the input signal. Then, the signal conditioner integrated circuit 246 will transmit the pluggable transceiver module interface signal which has been conditioned to the connecting wire 28. The connecting wire 28 will be directly connected with the signal conditioner integrated circuit 246 and be configured to transmit the pluggable transceiver module interface signal.

The connecting wire 28 is electrically connected to the pluggable transceiver module 282 and transmits the pluggable transceiver module interface signal to the pluggable transceiver module 282. Specifically, the connecting wire 28 would be a hybrid cable which comprises three links, the data link, the power link and the control link. The data link would be the high-speed communication cable to transmit signals in high speed. In the embodiments of the present invention, the data link would be a twin axial cable. The twin axial cable is designed for high-frequency signal transmission. It can be transmit a distance of 5-7 meters in a transmission speed of 10 Gbit/s. In another embodiment, the data link would be an optical fiber cable. The power link will be charged from the pluggable transceiver module to provide power to the media converter module. The power link would be two power lines, one for positive and the other for negative. The control link will transmit the control signal from the pluggable transceiver module to the media converter module to setup the parameters or to transmit the status signal from the media converter module to the pluggable transceiver module so the back-end switching system would monitor its status. In addition, each end of the connecting wire 28 further comprises a strain relief port 280 to release the strains generated from the connections between the connecting wire 28 and the media converter module 24 and between the connecting wire 28 and the pluggable transceiver module 282.

Moreover, the pluggable transceiver module interface signal will be transmitted to the signal conditioner integrated circuit 2820. The signal conditioner integrated circuit 2820 will condition the integrity of the physical layer signal of the pluggable transceiver module interface signal and transmit to the pins 2822 after the pluggable transceiver module interface signal being conditioned. In the embodiment of the present invention, the pluggable transceiver module 282 complies with the specifications defined by the standards of SFF-8431 Specification for Enhanced Small Form Factor Pluggable Module SFP+ and SFF-8432 Specification for Improved Pluggable Form Factor. The pluggable transceiver module 282 would be, for example, but not limited to, an enhanced Small Form-factor Pluggable (SFP+) optical transceiver module, a 10 Gigabit Small Form-factor Pluggable (XFP) optical transceiver module, an XENPAK optical transceiver module, an X2 optical transceiver module, an enhanced Quad Small Form-factor Pluggable (QSFP+) optical transceiver module, a QSFP10 optical transceiver module, a QSFP14 optical transceiver module, a QSFP28 optical transceiver module, a C Form-factor Pluggable (CFP) optical transceiver module, a CFP2 optical transceiver module and a CFP4 optical transceiver module.

Similarly, the direct attach media converter 3 will also transform the pluggable transceiver module interface signal into the RJ-45 interface signal. The pluggable transceiver module interface signal will be received by the pluggable transceiver module 282 and transmitted to the media converter module 24 through the connecting wire 28. The physical layer integrated circuit 244 of the media converter module 24 will transform the pluggable transceiver module interface signal to the RJ-45 interface signal. The rest operations of each unit are similar with the aforesaid.

Figure 4:
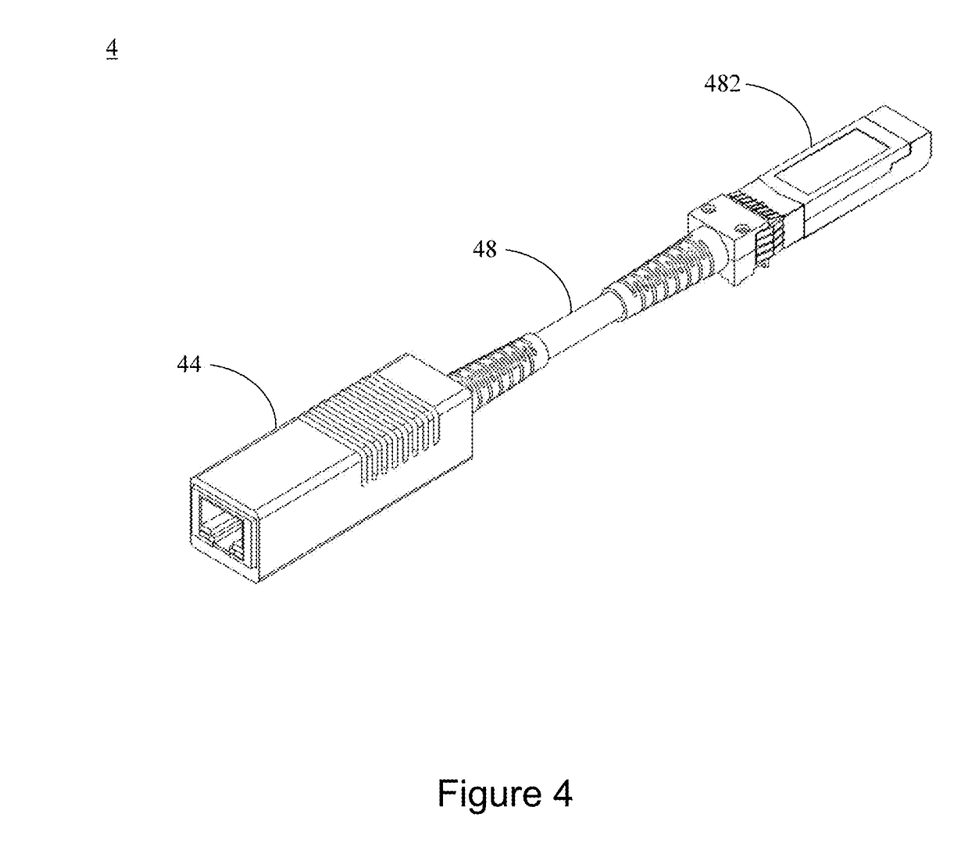
FIG. 4 is an illustration of one embodiment of the direct attach media converter system of the present invention.

As shown in FIG. 4, a direct attach media converter 4 of the third embodiment of the present invention has been illustrated. The direct attach media converter 4 is one of an exemplary embodiment of the direct attach media converter 3, which comprises a media converter module 44, a connecting wire 48 and a pluggable transceiver module 482. Specifically, the pluggable transceiver module 482 is an SFP+ optical transceiver module. The function and operations of the direct attach media converter 4 are similar with the media converter 3.

Figure 5:
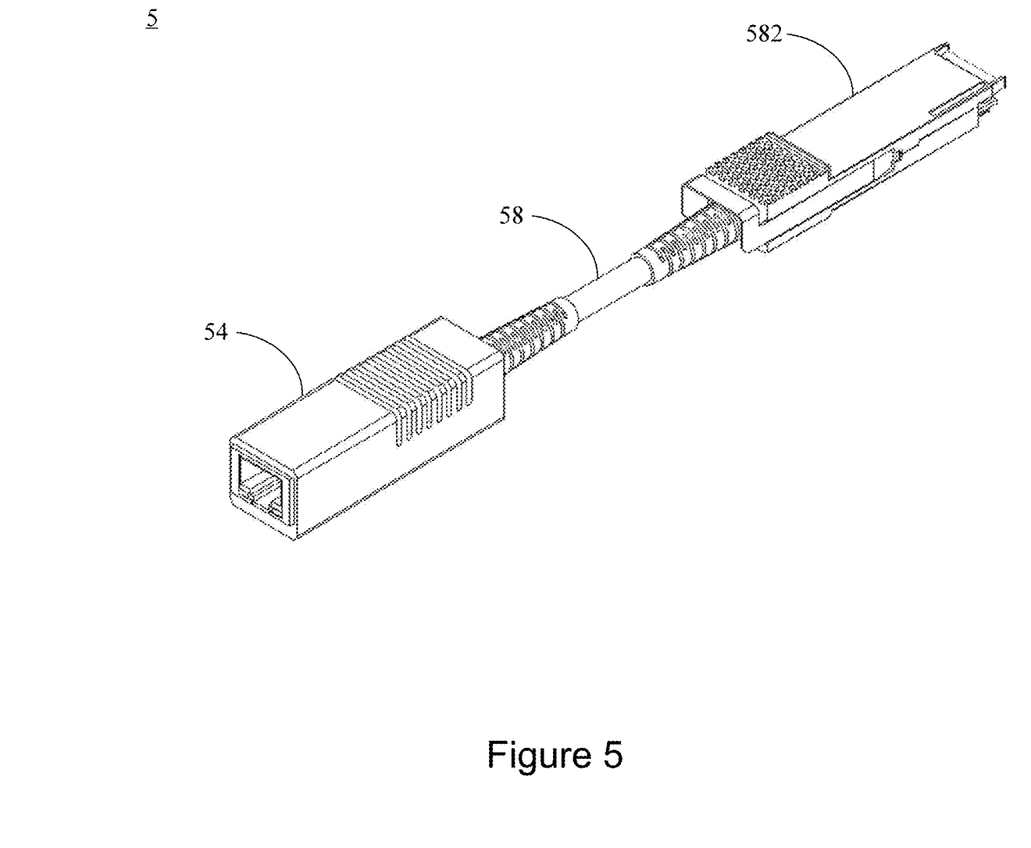
FIG. 5 is an illustration of another embodiment of the direct attach media converter system of the present invention.

As shown in FIG. 5, a direct attach media converter 5 of the forth embodiment of the present invention has been illustrated. The direct attach media converter 5 is another exemplary embodiment of the direct attach media converter 3, which comprises a media converter module 54, a connecting wire 58 and a pluggable transceiver module 582. Specifically, the pluggable transceiver module 582 is a QSFP+ optical transceiver module. The function and operations of the direct attach media converter 5 are similar with the media converter 3.

The direct attach media converter of the present invention uses the connecting wire electrically connecting to the media converter module so the pluggable transceiver module interface signal which has been transformed by the media converter module would be directly transmitted to the connecting wire without passing through the links of the pluggable transceiver module and the pluggable transceiver module interface port. That is, the direct attach media converter of the present invention needs only one single transceiver module. Thus, the present invention can solve the problem of the complexity and the difficulty of excessive pluggable transceiver module links and high costs for building the communication links of the prior art. The media converter system of the present invention would be simplified and enhance the quality of signal transmission.

The above embodiment is used to illustrate the principle and efficacy of the present invention and show the inventive features thereof, but not to limit the scope of protection of the present invention. People skilled in this field may proceed with a variety of modifications and replacements based on the disclosures and suggestions of the invention as described without departing from the technical principle and spirit thereof. Therefore, the scope of protection of the present invention is as that defined in the claims as appended.

What is claimed is:

1. A direct attach media converter, comprising:
   a media converter module, comprising
   a physical layer integrated circuit, to transform a RJ-45 interface signal into a pluggable transceiver module interface signal or transform a pluggable transceiver module interface signal into a RJ-45 interface signal; and
   a signal conditioner integrated circuit, electrically connected to the physical layer integrated circuit, to condition the pluggable transceiver module interface signal;
   a connecting wire; directly connected to the signal conditioner integrated circuit, to transmit the pluggable transceiver module interface signal; and
   a pluggable transceiver module, electrically connected to the connecting wire, to receive and transmit the pluggable transceiver module interface signal.

2. The direct attach media converter of claim 1, wherein the media converter module further comprising:
   a RJ-45 interface port, to receive the RJ-45 interface signal; and
   a converter, electrically connecting between the RJ-45 interface port and the physical layer integrated circuit, to providing isolation between the RJ-45 interface port and the physical layer integrated circuit.

3. The direct attach media converter of claim 1, wherein the connecting wire comprises a data link, the data link is a twin axial cable or an optical fiber cable.

4. The direct attach media converter of claim 1, wherein the connecting wire comprises a power link, to provide power from the pluggable transceiver module to the media converter module.

5. The direct attach media converter of claim 1, wherein the connecting wire comprises a control link, to transmit a control signal from the pluggable transceiver module to the media converter module or transmit a status signal from the media converter module to the pluggable transceiver module.

6. The direct attach media converter of claim 1, wherein the RJ-45 interface signal is one of a 10GBASE-T interface signal, a 40GBASE-T interface signal and a 100GBASE-T interface signal.

7. The direct attach media converter of claim 1, wherein the pluggable transceiver module interface signal is one of an XFI/SFI interface signal, an XAUI interface signal, an XLAUI interface signal and a CAUI interface signal.

8. The direct attach media converter of claim 1, wherein the pluggable transceiver module interface signal is one of an enhanced Small Form-factor Pluggable (SFP+) optical transceiver module, a 10 Gigabit Small Form-factor Pluggable (XFP) optical transceiver module, an XENPAK optical transceiver module, an X2 optical transceiver module, and an enhanced Quad Small Form-factor Pluggable (QSFP+) optical transceiver module.

9. A media converter module, directly connected to a connecting wire, comprising:

a housing, comprising an interface port, pluggably connected to a RJ-45 cable to receive a RJ-45 interface signal; and a converter circuit, electrically connected between the interface port and the connecting wire, to transform the RJ-45 interface signal into a pluggable transceiver module interface signal or transform a pluggable transceiver module interface signal into the RJ-45 interface signal, including:

a physical layer integrated circuit, to transform the RJ-45 interface signal into the pluggable transceiver module interface signal or transform the pluggable transceiver module interface signal into the RJ-45 interface signal;

a converter, electrically connecting between the interface port and the physical layer integrated circuit, to provide isolation between the interface port and the physical layer integrated circuit; and a signal conditioner integrated circuit, electrically connected to the physical layer integrated circuit, and directly connected to the connecting wire, to condition the pluggable transceiver module interface signal.

10. The media converter module of claim 9, wherein the RJ-45 interface signal is one of a 10GBASE-T interface signal, a 40GBASE-T interface signal and a 100GBASE-T interface signal.

11. The media converter module of claim 9, wherein the pluggable transceiver module interface signal is one of an XFI/SFI interface signal, an XAUI interface signal, an XLAUI interface signal and a CAUI interface signal.

* * * * *